(12) United States Patent
Pallett et al.

(10) Patent No.: US 9,919,708 B2
(45) Date of Patent: *Mar. 20, 2018

(54) SELECTABLE AUTONOMOUS DRIVING MODES

(71) Applicant: FORD GLOBAL TECHNOLOGIES, LLC, Dearborn, MI (US)

(72) Inventors: Tobias John Pallett, Farmington, MI (US); Jeffrey Allen Doering, Canton, MI (US); Anthony David Tsakiris, Beverly Hills, MI (US); Kyle Richard Post, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/153,779

(22) Filed: May 13, 2016

(65) Prior Publication Data
US 2016/0251016 A1  Sep. 1, 2016

Related U.S. Application Data

(63) Continuation of application No. 14/330,251, filed on Jul. 14, 2014, now Pat. No. 9,365,218.

(51) Int. Cl.
*G01C 22/00* (2006.01)
*B60W 30/182* (2012.01)
(Continued)

(52) U.S. Cl.
CPC ........ *B60W 30/182* (2013.01); *B60W 50/082* (2013.01); *B60W 50/085* (2013.01);
(Continued)

(58) Field of Classification Search
USPC .......................................................... 701/23
See application file for complete search history.

(56) References Cited

U.S. PATENT DOCUMENTS

| 5,513,107 A | 4/1996 | Gormley |
| 5,875,412 A | 2/1999 | Sulich et al. |

(Continued)

FOREIGN PATENT DOCUMENTS

| GB | 2499252 | 8/2012 |
| GB | 2526656 | 2/2015 |
| KR | 1020080028527 | 4/2008 |

OTHER PUBLICATIONS

Hurley, "BMW i8: New German Hybrid," Apr. 24, 2014, www.azureazure.com (4 pages).

(Continued)

*Primary Examiner* — Tyler D Paige
(74) *Attorney, Agent, or Firm* — Frank A. MacKenzie; Bejin Bieneman PLC

(57) ABSTRACT

A vehicle system includes a user interface device and an autonomous mode controller. The user interface device receives a user input representing a driving mode selection. The autonomous mode controller commands one or more vehicle subsystems to operate in accordance with characteristics associated with the driving mode selection. Examples of characteristics can include how aggressively the vehicle accelerates or decelerates, a minimum distance from the vehicle to a front vehicle, or how frequently the vehicle changes lanes, among others.

3 Claims, 1 Drawing Sheet

(51) Int. Cl.
*B60W 50/08* (2012.01)
*G01C 21/34* (2006.01)
*G05D 1/02* (2006.01)
*B60Q 3/80* (2017.01)

(52) U.S. Cl.
CPC ....... *G01C 21/3469* (2013.01); *G05D 1/0217* (2013.01); *B60Q 3/80* (2017.02)

(56) References Cited

U.S. PATENT DOCUMENTS

| | | | |
|---|---|---|---|
| 6,205,374 | B1 | 3/2001 | Kljima et al. |
| 6,836,719 | B2 | 12/2004 | Andersson et al. |
| 8,634,980 | B1 | 1/2014 | Urmson et al. |
| 8,676,427 | B1 | 3/2014 | Ferguson et al. |
| 8,676,466 | B2 | 3/2014 | Mudalige |
| 9,365,218 | B2 * | 6/2016 | Pallett ................. B60W 50/082 |
| 2007/0061053 | A1 | 3/2007 | Zeitzew |
| 2008/0195435 | A1 * | 8/2008 | Bentley ............. G06Q 30/0603 705/7.33 |
| 2009/0018712 | A1 | 1/2009 | Duncan et al. |
| 2009/0306866 | A1 | 12/2009 | Malikopoulos |
| 2010/0082195 | A1 * | 4/2010 | Lee ..................... B62D 15/025 701/25 |
| 2011/0106339 | A1 | 5/2011 | Phillips et al. |
| 2011/0251768 | A1 * | 10/2011 | Luo ...................... B60W 30/12 701/70 |
| 2012/0203424 | A1 * | 8/2012 | Filev .................... B60W 50/00 701/36 |
| 2012/0203426 | A1 * | 8/2012 | Held .................... B60W 40/09 701/36 |
| 2012/0271500 | A1 | 10/2012 | Tsimhoni et al. |
| 2012/0283911 | A1 | 11/2012 | Lee et al. |
| 2012/0316699 | A1 | 12/2012 | Filev et al. |
| 2013/0166100 | A1 | 6/2013 | Gordh et al. |
| 2013/0325202 | A1 | 12/2013 | Howard et al. |
| 2013/0325241 | A1 | 12/2013 | Lombrozo et al. |
| 2014/0025259 | A1 | 1/2014 | Szwabowski et al. |
| 2014/0077941 | A1 * | 3/2014 | Yamamura ........... B60W 20/00 340/438 |
| 2014/0148988 | A1 | 5/2014 | Lathrop et al. |
| 2014/0303827 | A1 | 10/2014 | Dolgov et al. |
| 2015/0012167 | A1 * | 1/2015 | Wolter ................. B60W 50/00 701/23 |
| 2015/0149017 | A1 * | 5/2015 | Attard ................. B60W 30/182 701/23 |
| 2015/0166069 | A1 * | 6/2015 | Engelman ........... B60W 30/12 701/23 |
| 2016/0009291 | A1 * | 1/2016 | Pallett ................. B60W 50/082 701/23 |
| 2016/0026182 | A1 * | 1/2016 | Boroditsky .......... H04L 67/306 701/23 |
| 2016/0314224 | A1 * | 10/2016 | Wei ....................... G05B 17/02 |
| 2017/0113689 | A1 * | 4/2017 | Gordon ............... B60W 30/182 |

OTHER PUBLICATIONS

GB Search Report for Application No. GB1511700.5 dated Jan. 29, 2016.

* cited by examiner

SELECTABLE AUTONOMOUS DRIVING MODES

CROSS-REFERENCE TO RELATED APPLICATION

This application is a continuation application of U.S. Application Ser. No. 14/330251, filed Jul. 14, 2014, titled "SELECTABLE AUTONOMOUS DRIVING MODES", which is hereby incorporated by reference in its entirety.

BACKGROUND

Autonomous vehicles can enhance the travelling experiences. In some respects, the autonomous vehicle is a virtual chauffeur that takes an occupant to his or her destination. During the trip, the occupant is free to do other things. A comfortable and enjoyable ride is also important.

DETAILED DESCRIPTION

Not all autonomous vehicle owners have the same tastes when it comes to how the autonomous vehicle should operate. Some owners prefer a sporty driving style while others prefer the vehicle to have a luxury feel. An individual owner's tastes may change from time to time. One day, the owner may wish for the autonomous vehicle to maximize fuel economy. The next, however, the owner may wish to arrive at the target destination as soon as possible. Accordingly, the autonomous vehicle may permit the owner or another occupant to select a driving mode.

An example vehicle system for implementing one of multiple selectable driving modes includes a user interface device and an autonomous mode controller. The user interface device receives a user input representing a driving mode selection. The driving mode selection may include, e.g., a "time to target" mode, an "eco-friendly" mode, a "chauffeur" mode, a "sport" mode, or a "racecar" mode. Each of these modes is discussed in greater detail below. The autonomous mode controller commands one or more vehicle subsystems to operate in accordance with characteristics associated with the driving mode selection. Examples of characteristics can include how aggressively the vehicle accelerates or decelerates, a minimum distance from the vehicle to a front vehicle, how frequently the vehicle changes lanes, the abruptness of steering actions, among others.

The vehicle and system shown may take many different forms and include multiple and/or alternate components and facilities. The exemplary components illustrated are not intended to be limiting. Indeed, additional or alternative components and/or implementations may be used.

Figure 1:
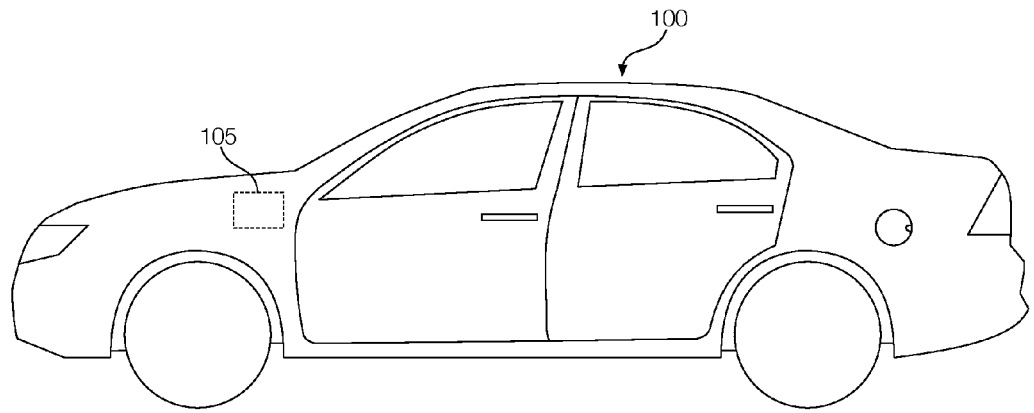
FIG. 1 illustrates an example autonomous vehicle with selectable driving modes.

As illustrated in FIG. 1, the autonomous vehicle 100 includes an autonomous driving system 105 configured to implement a selected driving mode. Once selected, the autonomous driving system 105 may control various vehicle subsystems in accordance with the selected mode. That is, the autonomous driving system 105 may adjust driving characteristics as well as a vehicle "personality." Examples of the driving modes may include a "time to target" mode, an "eco-friendly" mode, a "chauffeur" mode, a "sport" mode, and a "race car" mode.

When operating in the "time to target" mode, the autonomous driving system 105 may prioritize reaching the target destination as quickly as possible relative to traffic laws and the current traffic patterns. This may include aggressively accelerating and decelerating the vehicle 100, performing aggressive cornering maneuvers, aggressively entering and crossing traffic, changing lanes frequently, making more abrupt steering actions. Moreover, the autonomous driving system 105 may leave less room between the autonomous vehicle 100 and a front vehicle (i.e., the vehicle immediately in front of the autonomous vehicle 100). The "time to target" mode may further have the autonomous vehicle 100 drive at appropriate speeds relative to the speed limit and traffic density.

The "eco-friendly" mode may prioritize maximizing fuel economy. When operating in the "eco-friendly" mode, the autonomous driving system 105 may implement hyper-miling techniques such as minimizing vehicle accelerations and decelerations as much as possible and allowing increased distance between the autonomous vehicle 100 and the front vehicle. Another hyper-miling technique may include pulse driving. Pulse driving may include quickly accelerating to the driving speed and then coasting for as long as possible.

The autonomous driving system 105 may seek to maximize occupant comfort when operating in the "chauffeur" mode. For example, the autonomous driving system 105 may accelerate and decelerate more gradually than in some other modes. Additionally, the steering actions may be more fluid (e.g., less abrupt). The autonomous driving system 105 may further have the autonomous vehicle 100 gradually slow a great deal before reaching a speed bump or to avoid obstructions such as potholes. The suspension may also be "softened" when the autonomous vehicle 100 is operating in the "chauffeur" mode so the occupants feel fewer bumps. Moreover, the autonomous driving system 105 may keep an increased space from the front vehicle relative to the space left in other driving modes.

The "sport" mode may give the autonomous vehicle 100 a sportier feel to the occupants. When operating in the "sport" mode, the autonomous driving system 105 may implement more aggressive acceleration, deceleration, and cornering maneuvers, as well as more abrupt steering actions. The suspension system may be "stiffened" to permit faster cornering, for instance. When accelerating from a stop, the aggressive acceleration may cause more wheel slip than in some other modes. Noise may be less of a concern to occupants wishing for the autonomous vehicle 100 to operate in the "sport" mode. Therefore, the autonomous driving system 105 may allow for louder engine revving and higher available engine power.

The "racecar" mode may be implemented on a closed course or track. When in the "racecar" mode the autonomous driving system 105 may operate the autonomous vehicle 100 as if a professional racecar driver was driving the autonomous vehicle 100.

In addition to driving characteristics, the selected mode may be associated with a "personality." The "personality" may define a voice used to communicate with the vehicle occupants as well as the look of internal vehicle displays and interior lighting. The "personality" may be different for each mode. For example, the "personality" while operating in the "chauffer" mode may include a refined voice that one might associate with a traditional British butler. The "personality" for the "sport" and "racecar" modes, however, may include the voice of a famous professional racecar driver. The voice used while the autonomous vehicle 100 is operating in the "eco-friendly" mode may be of a well-known environmentalist.

Figure 2:
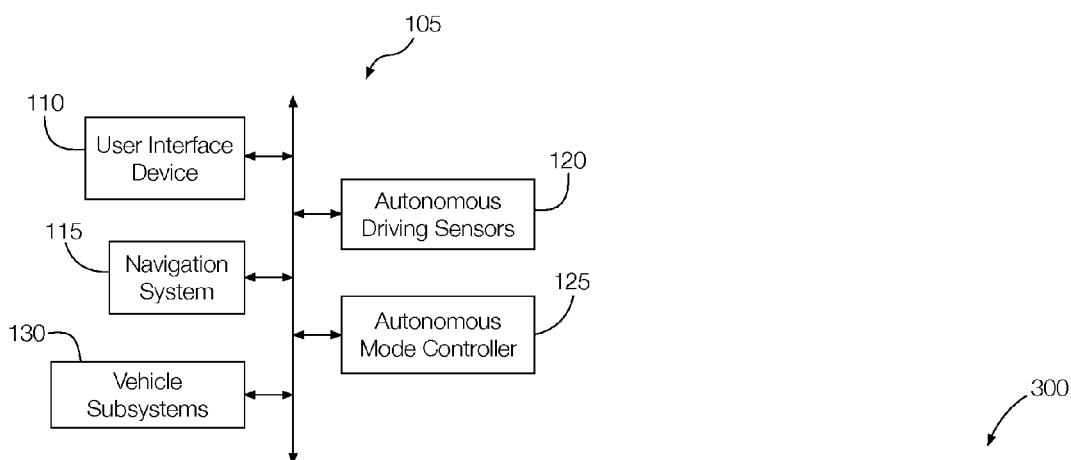
FIG. 2 is a block diagram of an example vehicle system that may be incorporated into the autonomous vehicle of FIG. 1 to provide multiple driving modes.

FIG. 2 is a block diagram of an example autonomous driving system 105 that may operate the autonomous vehicle 100 according to the selected driving modes discussed above. The autonomous driving system 105, as shown, includes a user interface device 110, a navigation system 115, at least one autonomous driving sensor 120, and an autonomous mode controller 125.

The user interface device 110 may be configured to present information to the vehicle occupants. The presented information may include audible information or visual information. Moreover, the user interface device 110 may be configured to receive user inputs, including a selection of one of the modes. Thus, the user interface device 110 may be located in the passenger compartment of the autonomous vehicle 100. In some possible approaches, the user interface device 110 may include a touch-sensitive display screen.

The user interface device 110 may adopt the "personality" of the selected driving mode. For instance, the user interface device 110 may communicate using one of the voices discussed above. Additionally, the user interface device 110 may adjust a color scheme to fit the "personality." The color scheme for the "chauffeur" mode may include mostly black and white while the color scheme for the "sport" or "racecar" modes may include bright colors or the color schemes of well-known racecars. The color scheme for the "eco-friendly" mode may include green, which is sometimes associated with environmentally friendly objects.

The navigation system 115 may be configured to determine a current location of the autonomous vehicle 100 using, e.g., a Global Positioning System (GPS) receiver configured to triangulate the position of the autonomous vehicle 100 relative to satellites or terrestrial based transmitter towers. The navigation system 115 may be further configured to develop routes from the current location to a selected destination, as well as display a map and present driving directions to the selected destination via, e.g., the user interface device 110. In some instances, the navigation system 115 may develop the route according to the selected mode. That is, when operating in the "time to travel" mode, the navigation system 115 may select the fastest route. Alternatively, when operating in the "eco-friendly" mode, the navigation system 115 may choose the route that maximizes fuel economy.

The autonomous driving sensors 120 may include any number of devices configured to generate signals that help navigate the autonomous vehicle 100. Examples of autonomous driving sensors 120 may include a radar sensor, a lidar sensor, a vision sensor (i.e., a camera), vehicle to vehicle/infrastructure networks, or the like. The autonomous driving sensors 120 help the autonomous vehicle 100 "see" the roadway and the vehicle surroundings and/or negotiate various obstacles while the vehicle 100 is operating in the autonomous mode. The autonomous driving sensors 120 may be configured to output sensor signals to, e.g., the autonomous mode controller 125.

The autonomous mode controller 125 may be configured to control one or more subsystems 130 while the vehicle 100 is operating in the autonomous mode. Examples of subsystems 130 that may be controlled by the autonomous mode controller 125 may include a brake subsystem, a suspension subsystem, a steering subsystem, and a powertrain subsystem. The autonomous mode controller 125 may control any one or more of these subsystems 130 by outputting signals to control units associated with these subsystems 130. The autonomous mode controller 125 may control the subsystems 130 based on the mode selection provided by the occupant via the user interface device 110 and signals generated by the autonomous driving sensors 120.

To autonomously control the vehicle 100 in accordance with the selected mode, the autonomous mode controller 125 may output appropriate commands to the subsystems 130. The commands may cause the subsystems 130 to operate in accordance with the driving characteristics associated with the selected driving mode. As discussed above, examples of driving characteristics may include how aggressively the autonomous vehicle 100 accelerates and decelerates, how much space the autonomous vehicle 100 leaves behind a front vehicle, how frequently the autonomous vehicle 100 changes lanes, etc. Moreover, the autonomous mode controller 125 may output commands to the user interface device 110 that cause the user interface device 110 to adopt the "personality" associated with the selected mode, immersing the occupant in the desired travelling experience.

Figure 3:
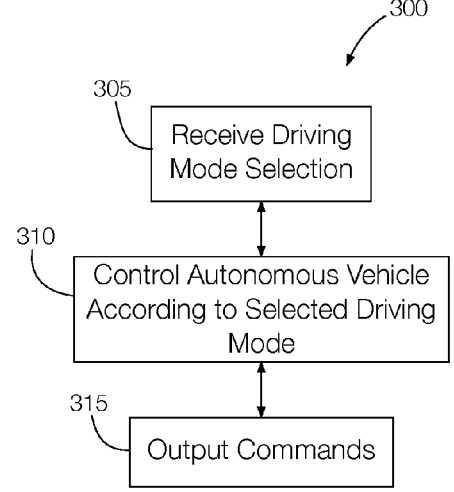
FIG. 3 is a flowchart of an example process that may be executed by the vehicle system to provide multiple driving modes.

FIG. 3 is a flowchart of an example process 300 that may be implemented by the autonomous driving system 105. The process 300 may be executed by, e.g., the autonomous mode controller 125.

At block 305, the autonomous mode controller 125 may receive the mode selection. The mode selection may be received from the vehicle occupant via the user interface device 110. The user interface device 110 may transmit a signal representing the mode selection to the autonomous mode controller 125.

At block 310, the autonomous mode controller 125 may operate the autonomous vehicle 100 according to the selected mode. Using the signals received from the autonomous driving sensors 120 and the navigation system 115, the autonomous mode controller 125 may take the occupant to his or her target destination using driving characteristics consistent with the selected mode. The driving characteristics may relate to how aggressively the autonomous vehicle 100 accelerates and decelerates, how much space the autonomous vehicle 100 leaves behind a front vehicle, how frequently the autonomous vehicle 100 changes lanes, the abruptness of the steering actions, etc.

At block 315, the autonomous mode controller 125 may output commands to the user interface device 110 and subsystems 130. The commands may cause, e.g., the user interface device 110 to adopt the "personality" of the selected driving mode and for the subsystems 130 to achieve certain driving characteristics. As discussed above, the "personality" may include a voice and color scheme used by the user interface device 110 to communicate with the occupants. Because the user interface device 110 has adopted the "personality" of the selected mode, the occupant is immersed in the desired travelling experience. The process 300 may end after block 315, which may occur after the autonomous vehicle 100 reaches its destination.

In general, the computing systems and/or devices discussed above may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a user interface device configured to present a plurality of driving modes and receive a user input representing a driving mode selection from among the plurality of driving modes, wherein each driving mode defines at least one predefined characteristic associated with autonomous control of a vehicle; and
   an autonomous mode controller configured to command at least one vehicle subsystem to operate in accordance with the predefined characteristics associated with the driving mode selection to autonomously control the vehicle, wherein the user interface device is configured to output audible information in accordance with a voice associated with the driving mode selection.

2. A method of autonomously controlling a vehicle, the method comprising:

presenting a plurality of driving modes via a user interface device, each driving mode defining at least one predefined characteristic associated with autonomously controlling the vehicle;

receiving a selection of a driving mode; and commanding at least one vehicle subsystem to operate in accordance with the predefined characteristics associated with how the vehicle navigates through traffic while in the selected driving mode, wherein commanding the vehicle subsystem includes commanding a user interface device to output audible information with a voice associated with the driving mode selection.

3. A method of autonomously controlling a vehicle, the method comprising:

presenting a plurality of driving modes via a user interface device, each driving mode defining at least one predefined characteristic associated with autonomously controlling the vehicle;

receiving a selection of a driving mode; and commanding at least one vehicle subsystem to operate in accordance with the predefined characteristics associated with how the vehicle navigates through traffic while in the selected driving mode, wherein the predefined characteristics are exclusive of learned driver behavior.

* * * * *